United States Patent [19]

Subramanian et al.

[11] Patent Number: 5,399,324

[45] Date of Patent: Mar. 21, 1995

[54] TWO-STAGE CATALYST SYSTEM FOR LEAN BURN ENGINES

[75] Inventors: Somasundaram Subramanian, Melvindale; Robert J. Kudla, Warren; Mohinder S. Chattha, Northville, all of Mich.

[73] Assignee: Ford Motor Company, Dearborn, Mich.

[21] Appl. No.: 255,847

[22] Filed: Jun. 8, 1994

Related U.S. Application Data

[63] Continuation of Ser. No. 1,969, Jan. 8, 1993, abandoned.

[51] Int. Cl.[6] ............................................. B01J 21/06
[52] U.S. Cl. ................................. 423/213.7; 422/171; 422/177; 422/211; 423/213.5; 423/239.1; 423/246; 423/247; 502/261; 502/262; 502/304; 502/306; 502/325; 502/332; 502/333; 502/334; 502/339; 60/274; 60/301
[58] Field of Search ............... 422/171, 177, 211, 179, 422/180, 221, 222; 502/325, 339, 332, 333, 334, 304, 306, 261, 262; 423/239, 235, 246, 247, 213.5, 213.7, 239.1; 60/301, 274

[56] References Cited

U.S. PATENT DOCUMENTS

| | | |
|---|---|---|
| 3,397,034 | 8/1968 | Tulleners et al. |
| 3,656,915 | 4/1972 | Tourtellotte .................... 422/171 |
| 3,867,508 | 2/1975 | Hass ................................ 423/213.7 |
| 3,896,616 | 7/1975 | Keith et al. ....................... 60/274 |
| 4,188,364 | 2/1980 | Gladden ........................ 423/213.2 |
| 4,374,103 | 2/1983 | Gandhi et al. ................ 423/213.5 |
| 4,520,124 | 5/1985 | Abe et al. ................. 423/213.2 X |
| 4,737,345 | 4/1988 | Henke ............................ 422/109 |
| 4,833,113 | 5/1989 | Imanari et al. ............ 423/239 A X |
| 5,039,644 | 8/1991 | Lachman et al. . |

FOREIGN PATENT DOCUMENTS 0070736 1/1983 European Pat. Off. .

*Primary Examiner*—Amalia L. Santiago
*Attorney, Agent, or Firm*—Lorraine S. Melotik; Roger L. May

[57] ABSTRACT

The present invention broadly relates to a catalyst system for promoting oxidation-reduction reactions of the exhaust gases produced by an internal combustion engine wherein the catalyst comprises a two-stage system of a first-stage nitric oxide removal (by reduction) catalyst and a second-stage carbon monoxide and hydrocarbon removal (by oxidation) catalyst. The first-stage catalyst comprises between about 0.1 and 3% by weight tungsten carried on a support material comprising mostly γ-alumina. The second-stage catalyst is an oxidation catalyst such as platinum on alumina.

10 Claims, 2 Drawing Sheets

TWO-STAGE CATALYST SYSTEM FOR LEAN BURN ENGINES

This application is a continuation of application Ser. No. 08/001,969, filed Jan. 8, 1993, now abandoned.

BACKGROUND OF THE INVENTION

Reference is made to related application Ser. No. 08/001,702 entitled "Base Metal Only Catalyst System for Lean Burn Engines" filed Jan. 7, 1993 by the present inventors, which application is commonly assigned with this invention.

This invention is directed to a two-stage catalyst system comprising a first-stage nitric oxide removal catalyst and a second-stage carbon monoxide and hydrocarbon removal catalyst for treating the exhaust gases produced by an internal combustion engine.

A number of catalysts have been suggested to convert engine exhaust gas components like carbon monoxide (CO), hydrocarbons (HC's), and nitrogen oxides ($NO_x$) into other gases. The first two are desirably oxidized to $H_2O$ and $CO_2$ while the nitrogen oxides present in the exhaust gas, generally nitric oxide, are desirably reduced to $N_2$. These so called "three-way" catalysts achieve simultaneous efficient (conversion >80%) removal of CO, HC, and $NO_x$ when the fuel mixture of an internal combustion engine is slightly "rich" in fuel, i.e., in a narrow A/F ratio range between about 14.7 and 14.4, and the exhaust gas is slightly reducing. Such three-way catalysts are not efficient, however, in the reduction of $NO_x$ when engines are operated on the lean (reduced fuel) side where the A/F ratio is greater than 14.7, generally 19-27, and the exhaust gas is richer in oxygen. It is desirable, however, to operate engines on the lean side to realize a benefit in fuel economy, estimated to be in the range of 6-10%.

In addition to three-way catalysts, two-stage conversion systems have also been proposed for treating exhausts and involve an initial contacting zone directed to removal of $NO_x$ and a second contacting zone directed to removal of CO and HC's.

Gladden in U.S. Pat. No. 4,188,364 discloses a system wherein the nitric oxide content is reduced through a reaction with ammonia in the first catalyst bed comprising a porous inorganic oxide. The gas stream, containing oxygen, ammonia and reduced nitric oxide content is subsequently contacted with a second catalyst bed having an oxidation catalyst disposed on a porous inorganic oxide carrier, comprising a noble metal or other metals such as copper, zinc, or tungsten. The resultant exhaust stream is disclosed to be substantially nitric oxide and ammonia free. Gladden's invention is not suitable for automotive application, however, because this system requires the storage of ammonia on board a vehicle.

Gandhi et al. in U.S. Pat. No. 4,374,103 disclose a catalyst system useful in fuel-rich applications in which the exhaust gases initially flow over a catalyst comprising palladium and subsequently over a catalyst comprising palladium-deposited on tungsten. The first catalyst bed operates slightly rich of stoichiometry. Since the engine is required to operate fuel-rich to provide reducing conditions at the inlet of the catalyst, fuel economy is adversely affected. Also, tungsten is present on the support in large amounts, generally around 50% by weight of alumina, in the second-stage catalyst.

It would be desirable to have a catalyst system which would be effective in reducing nitric oxide emissions and also provide high conversions for hydrocarbons and carbon monoxide under lean-burn conditions (oxygen rich exhaust situations). Such a system would allow for improved fuel economy. In lean burn situations, considerable success has been achieved in the catalytic oxidation of unburned hydrocarbons and carbon monoxide, but the reduction of the nitrogen oxides has proven to be a much more difficult problem. This is because the reducing substances (such as CO or $H_2$) tend to react more quickly with the oxygen present in the exhaust gas than with the oxygen associated with nitrogen in $NO_x$. The present invention overcomes such problems.

SUMMARY OF THE INVENTION

The present invention broadly relates to a catalyst for promoting oxidation-reduction reactions of the exhaust gases produced, e.g., by an internal combustion engine, wherein the catalyst comprises a two-stage system of a first-stage reducing catalyst and a second-stage oxidative catalyst. The exhaust gas may be automobile exhaust gas and the invention is adapted to be useful in lean-burn situations, i.e., with oxygen-rich environments. In such situations, the air to fuel ratio is generally 19-27. The first-stage catalyst comprises between about 0.1 and 3% by weight tungsten carried on a support material comprising mostly $\gamma$-alumina. The first stage is preferably made by impregnating the $\gamma$-alumina support material with a solution of a tungsten containing compound in an aqueous or organic solvent, subsequently drying the impregnated $\gamma$-alumina and later calcining it to leave a coating of tungsten or tungsten oxide on the support material. The first-stage catalyst containing a very low loading of tungsten is active in converting $NO_x$ to $N_2$ because of its ability to catalyze the reaction between $NO_x$ and propane ($C_3H_8$) in the presence of $O_2$. Oxygen is a substantial component of the exhaust gas stream of lean-burn engines because lean-burn systems add more oxygen into the A/F mixture than is required for the complete combustion of the fuel. The second-stage catalyst is an oxidizing catalyst including conventional oxidizing catalysts such as a noble metal on alumina.

This invention according to another embodiment is directed to a method for the purification of exhaust gases which comprises sequentially exposing the two-stage exhaust gas catalyst system disclosed above to exhaust gases of an internal combustion engine.

DETAILED DESCRIPTION OF THE PREFERRED EMBODIMENTS

Figure 1:
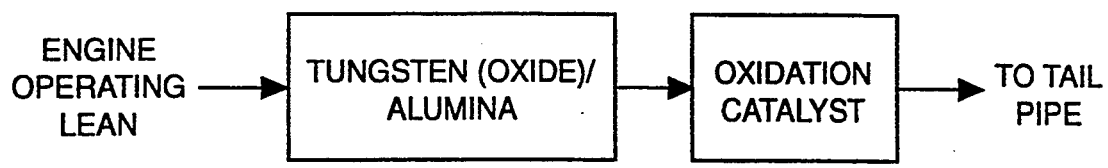
FIG. 1 schematically depicts a two-stage catalyst system according to the present invention.

As shown in FIG. 1, this invention is directed to a two-stage system for the purification of exhaust gases containing nitrogen oxides, carbon monoxide, and hydrocarbons. It is particularly suitable for use with lean-burn internal combustion engines, such as automotive engines. The first-stage catalyst is placed closed to the engine manifold, and converts $NO_x$ to $N_2$ through reduction reaction with hydrocarbons present in the exhaust gas stream. It also converts a portion of the hydrocarbons present to carbon dioxide and water and a portion of hydrogen to water. The partial conversion of carbon monoxide into carbon dioxide also occurs. The exhaust gases then pass through a second-stage catalyst which further oxides any reducing species present.

The first-stage catalyst comprises mostly $\gamma$-alumina as a support material (herein termed "$\gamma$-alumina support material") carrying tungsten or tungsten oxide. The support material is loaded such that the amount of tungsten is between 0.1 and 3% by weight of the entire catalyst (i.e., tungsten supported on alumina).

The tungsten is generally provided on the support by impregnating the $\gamma$-alumina support material with an aqueous or organic solvent solution comprising a tungsten containing compound. Exemplary of such tungstates are ammonium metatungstate, metatungstic acid, tungstyl acetylacetonate, and tungsten hexahalides. Particularly preferred is ammonium metatungstate. Any tungsten compound which is soluble in an aqueous or organic medium and whose functional group is capable of being decomposed by heat to leave only tungsten or its oxide on the support material may be employed in this invention. Other tungsten compounds useful in this invention in addition to those listed above will be apparent to those skilled in the art in view of this disclosure.

According to the method of impregnation disclosed above, the tungsten compound is dissolved generally by simply mixing the compound into an aqueous or organic solvent to make a solution thereof. Exemplary of such solvents are water, solution of alkalis like sodium hydroxide, ethanol, toluene, isopropyl alcohol, acetone, methylethylketone, butylacetate, and dimethylformamide. A solution of the tungsten compound, is made as described above, is generally further diluted for impregnation. The catalyst solution may also comprise a mixture of compatible organic solvents and/or compatible tungsten compounds.

The dissolved tungsten compound is subsequently provided on the $\gamma$-alumina support material. This support material, comprising mostly $\gamma$-alumina, is particularly preferred because it has high surface area, good adhesion and low tungsten/support chemical interaction. By "mostly $\gamma$-alumina" is meant that the support material comprises more than about 50% by weight, more preferably greater than 80%, and most preferably substantially all $\gamma$-alumina. In addition to the $\gamma$-alumina, however, if desired the $\gamma$-alumina support material may comprise other materials like cerium oxide, barium oxide, zirconium oxide, lanthanum oxide, titanium oxide, and $\alpha$-alumina.

"Support" is used herein to mean a material having a high surface area per unit volume and a good adhesion for catalyst applied thereto; "carrier" is used herein to mean the aggregation of support and catalytic compound excluding the carrier. A mechanical carrier is preferably comprised of a monolithic magnesium aluminum silicate structure (i.e., cordierite), although the configuration of which is not critical to the catalyst of this invention. The volume of the structure is measured by its exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure.

Coating of the $\gamma$-alumina support material is carried out to impart preferably 0.1–3% by weight of tungsten based on the weight of the entire catalyst (including the support). This support material is generally employed in granular form, preferably has a particle size in the range of 20–100 mesh, although particle size is not critical. In the case of a granular support, a mixture of the granular material and solution is stirred at an elevated temperature, generally of about 75°–120° C. to evaporate the solvent. The impregnated support material is then heated to decompose and eliminate the functional group from the mixture, such as by heating to 320° C. for one hour and thereafter for four hours at 600° C. The coating may alternatively be put directly on a monolith coated with $\gamma$-alumina support material.

If the heating is carried out in air, the tungsten compound decomposes and forms tungsten oxide. If, on the other hand, the heating is carried out in a reducing atmosphere, the tungsten compound may be reduced to elemental tungsten. When the first-stage catalyst is placed in use, oxygen present in the exhaust gas will oxidize the tungsten to tungsten oxide.

The second-stage catalyst according to the present invention comprises a conventional oxidation catalyst such as palladium on alumina. Unconverted CO and $H_2$ present in the exhaust of a lean-burn engine as well as HC's flow over the oxidation catalyst. This catalyst further oxidizes any reducing species present, resulting in near quantitative conversion of hydrocarbons, CO and $H_2$ to $CO_2$ and $H_2O$. While palladium on alumina is preferred for the second-stage catalyst, it is not meant to be so limited. This second stage catalyst may comprise other oxidation catalysts like, $TiO_2$—$Pd/La_2O_3/Al_2O_3$, $Pd/La_2O_2/Al_2O_3$, $Pt/Al_2O_3$, $Pd/Al_2O_3$ and $Pt/Rh/Al_2O_3$. While not as preferred as the above, the second-stage catalyst may comprise zeolite in place of the alumina. Metal may be provided on the zeolite by ion-exchange and/or impregnation as will be apparent to one skilled in the art in view of the present disclosure. Under these conditions, NO, HC and CO conversions of 81, 92 and 99%, respectively, were achieved with embodiments of the present invention systems in typical lean-burn situations of A/F of 19–27.

Test Procedure

The catalysts are characterized in a quartz flow reactor. Gases are blended in a manifold by means of mass-flow controllers, routed through either a bypass line or through the reactor. The gases later flow to an analytical train for analysis. The post-catalyst gases are then analyzed to determine the extent of reaction on various constituents. The catalyst used is in the form of powder. Total gas flow over the catalyst is 3.0 liters/minutes.

Figure 2:
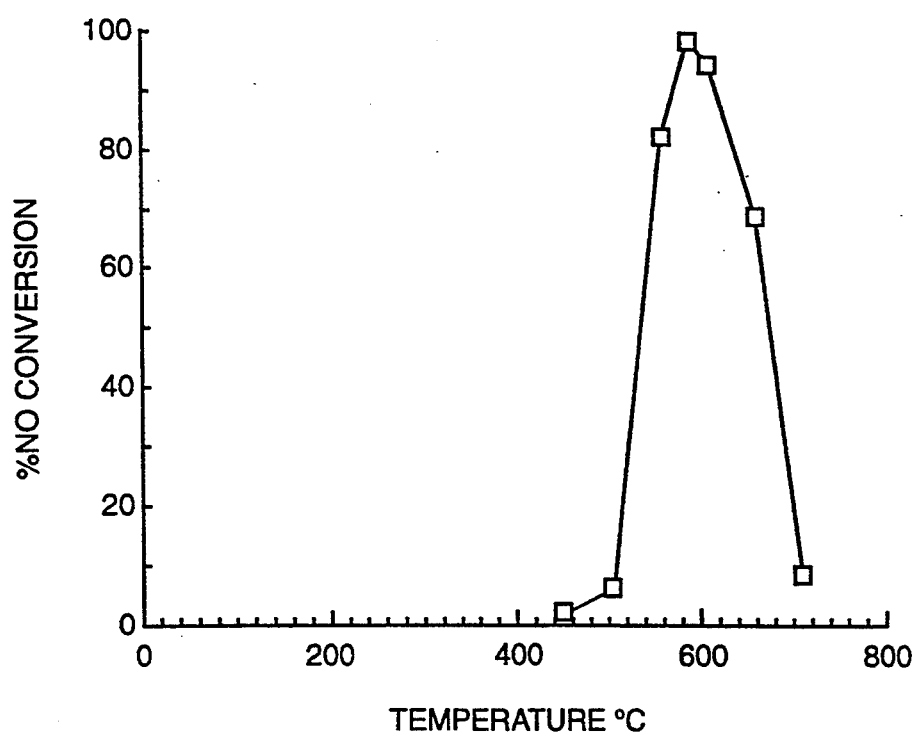
FIG. 2 graphically illustrates the effect of catalyst temperature on $NO_x$ removal from a $NO_x$—HC—$O_2$ containing feed gas mixture, the catalyst being an embodiment of the first stage of the two-stage catalyst system according to the present invention.

Example 1

γ-alumina (10 g of 20–40 mesh) is contacted with 12 cm$^3$ (incipient wetness) of aqueous ammonium metatungstate solution of desired concentration to form an embodiment of a first stage precursor catalyst according to the present invention. The precursor is dried at 120° C. for one hour and then calcined at 600° C. for six hours. The resulting $WO_3/\gamma\text{-}Al_2O_3$ catalyst has a W weight loading of 1%. A sample (2.8 g) of this first stage catalyst is evaluated in the flow reactor using the following feed gas (inlet): 1000 ppm NO, 40,000 ppm $O_2$, and 2050 ppm $C_3H_8$. This corresponds to a HC/NO ratio of 6.25 with HC as $C_1$. The redox ratio (ratio of reducing to oxidizing components in the feed gas) is 0.25. The total gas flow rate is 3000 cm$^3$/min. and the above conditions correspond to a space velocity of 38,570 hr.$^{-1}$ (packed density of catalyst is 0.6g/cm$^3$). The observed NO conversion is shown as a function of catalyst temperature in FIG. 2. The NO conversion is 99% at 580° C.

Example 2

The catalyst as prepared in Example 1 is evaluated using the following feed gas (inlet): 1000 ppm NO, 40,000 ppm $O_2$, and 750 ppm $C_3H_8$. The total gas flow rate is 3000 cm$^3$/min. and the above conditions correspond to a space velocity of 38,570 hr$^{-1}$ (packed density of catalyst is 0.6g/cm$^3$). The NO conversion is 58.8% at 580° C.

The catalyst as prepared in Example 1 is also evaluated using a different feed gas (inlet): 1000 ppm NO, 40,000 ppm $O_2$, 15,000 ppm CO, 5000 ppm $H_2$, 20,000 ppm $H_2O$, and 750 ppm $C_3H_8$. The total gas flow rate is 3000 cm$^3$/min. and the above conditions correspond to a space velocity of 38,570 hr.$^{-1}$ (packed density of catalyst is 0.6g/cm$^3$). The NO conversion is 53.0% at 580° C.

Example 3

The catalyst described in Example 1 is used as a first stage catalyst in forming a two-stage catalyst system according to the present invention. It is followed by a second-stage (downstream of the first-stage catalyst) $Pd/Al_2O_3$ catalyst (0.5 g). The catalyst system is tested using the following feed gas: 1000 ppm NO, 40,000 ppm $O_2$, 15,000 ppm CO, 5000 ppm $H_2$, 20,000 ppm HO, and 2500 ppm $C_3H_8$. The NO, CO, and HC conversions are 81, 92, and 99%, respectively, at 580° C.

Example 4

Figure 3:
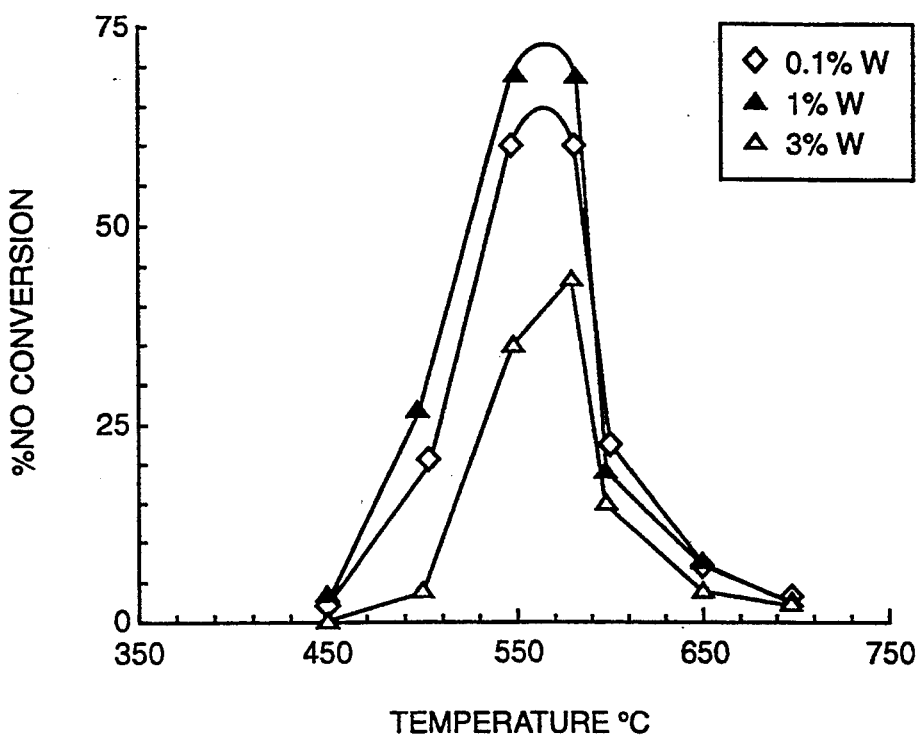
FIG. 3 graphically illustrates the effect of $WO_3$ loading and catalyst temperature on $NO_x$ conversion, the catalyst being an embodiment of the first stage of the two-stage catalyst system according to the present invention.

$WO_3/\gamma\text{-}Al_2O_3$ catalysts with W loadings of 0.1%, 1%, and 3% are prepared as described in Example 1. Such catalysts are embodiments of the first stage of the two-stage system according to the present invention. Samples (2.8 g) of these catalysts are evaluated using the following feed gas: 450 ppm NO, 40,000 ppm $O_2$, 15,000 ppm CO, 5000 ppm $H_2$, 20,000 ppm $H_2O$ and 900 ppm $C_3H_8$. The R value of the,feed gas is 0.36. The total gas flow rate is 3000 cm$^3$/min. The above conditions correspond to a space velocity of 38,570 hr.$^{-1}$. The NO conversion data for the catalysts is shown as a function of temperature in FIG. 3. This data suggests that preferred W loading is around 1%.

Example 5

Figure 4:
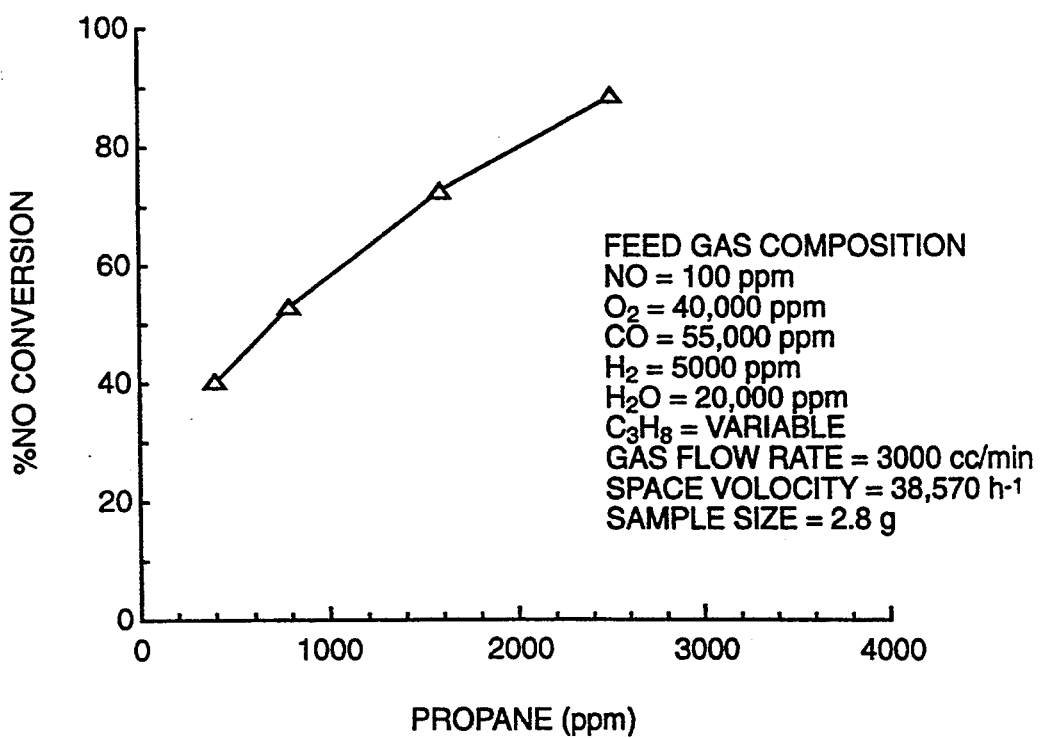
FIG. 4 graphically illustrates the effect of HC (propane) concentration on $NO_x$ conversion, the catalyst being an embodiment of the first stage of the two-stage catalyst system according to the present invention.

A $WO_3/\gamma\text{-}Al_2O_3$ catalyst with W loading of 1% is prepared as described in Example 1 as an embodiment of the first stage of the two-stage system according to the present invention. It is evaluated using the following feed gas: 1000 ppm NO, 40,000 ppm $O_2$, 15,000 ppm CO, 5000 ppm $H_2$, and 20,000 ppm $H_2O$. The $C_3H_8$ concentration is varied. The NO conversion is shown as a function of propane concentration in FIG. 4. It can be seen that the NO conversion increases with an increase in propane concentration.

Example 6

A $WO_3/\gamma\text{-}Al_2O_3$ catalyst with a W loading of 0.5% is prepared as described in Example 1, forming the first stage of a two-stage catalyst system according to an embodiment of the present invention. A sample (0.4 g) of a $TiO_2/Pd/La_2O_3/\gamma\text{-}Al_2O_3$ catalyst is used as the second stage. This two-stage catalyst system is evaluated using the following feed gas: 450 ppm NO, 40,000 ppm $O_2$, 15,000 ppm CO, 5000 ppm $H_2$, 20,000 ppm $H_2O$, and 900 ppm $C_3H_8$. The NO, CO, and HC conversions are 63, 87, and 92%, respectively, at 580° C.

Example 7

A $WO_3/\gamma\text{-}Al_2O_3$ catalyst with a W loading of 1.0% is prepared as described in Example. 1, forming the first stage of a two-stage catalyst system. A sample (0.5 g) of a $TiO_2/Pd/La_2O_3/\gamma\text{-}Al_2O_3$ catalyst is used in the second-stage. This catalyst system is evaluated using the following feed gas: 450 ppm NO, 40,000 ppm $O_2$, 15,000 ppm CO, 5000 ppm $H_2$, 20,000 ppm $H_2O$, and 900 ppm $C_3H_8$. The NO, CO, and HC conversions are 71, 91 and 95%, respectively, at 580° C.

Example 8

Metatungstic acid is used in lieu of ammonium metatungstate in forming a precursor according to the procedure described in Example 1. The precursor is dried at 120° C. for one hour and then calcined at 600° C. for six hours. The resulting $WO_3/\gamma\text{-}Al_2O_3$ catalyst (an embodiment of the first-stage of the present invention two-stage catalyst system) has a W weight loading of 0.1%. A sample (2.8 g) of this catalyst is evaluated in the flow reactor using the following feed gas (inlet): 450 ppm NO, 40,000 ppm $O_2$, 900 ppm $C_3H_8$, 15,000 ppm CO, 5000 ppm $H_2$, and 20,000 ppm $H_2O$. The NO conversion is 59% at 580° C.

Example 9

Zirconium oxide support material (10 g, 20–40 mesh) is contacted with 8 cm$^3$ aqueous ammonium metatungstate solution of desired concentration to form a first-stage catalyst precursor according to an embodiment of the present invention. The precursor is dried at 120° C. for one hour and then calcined at 600° C. for six hours. The resulting $WO_3/ZrO_2$ catalyst has a W weight loading of 0.25%. A sample (2.8 g) of this catalyst is evaluated in the flow reactor using the following feed gas (inlet): 1000 ppm NO, 40,000 ppm $O_2$, and 2050 ppm $C_3H_8$. This corresponds to a HC/NO ratio of 6.25 with HC as $C_1$. The NO conversion is 78% at 580° C.

Example 10

A $WO_3/Al_2O_3$ (2.8 g) catalyst having a W loading of 0.25% as prepared in Example 9 is used as the first-stage of a two-stage catalyst system according to the present invention. The second stage contains 0.5 g of Pt/γ-Al$_2$O$_3$ catalyst. The catalyst system is evaluated using the following feed gas: 450 ppm NO, 40,000 ppm O$_2$, 15,000 ppm CO, 5000 ppm H$_2$, 900 ppm C$_3$H$_8$, 20,000 ppm H$_2$O, and 20 ppm SO$_2$. The NO, CO, and HC conversions are 61, 89, and 92%, respectively, at 580° C.

We claim:

1. A two-stage catalyst system comprising a first-stage catalyst and a second-stage catalyst for promoting oxidation-reduction reactions of exhaust gases containing nitrogen oxides, carbon monoxide, and hydrocarbons, the system comprising:

a first-stage catalyst comprising between about 0.1 and 3% by weight tungsten carried on a support material consisting of more than about 50% by weight γ-alumina and, optionally, materials selected from the group consisting of cerium oxide, barium oxide, zirconium oxide, lanthanum oxide, α-alumina, and titanium oxide; and a second-stage catalyst comprising noble metal, said first-stage catalyst and said second-stage catalyst being in fluid communication, and said exhaust gas being exposed to said second-stage catalyst after being exposed to said first-stage catalyst.

2. A method of making a two-stage catalyst system comprising a first-stage catalyst and a second-stage catalyst for promoting oxidation-reduction reactions of exhaust gases containing nitrogen oxides, carbon monoxide, and hydrocarbons, the first-stage catalyst comprising between about 0.1 and 3% by weight tungsten carried on a support material; and the second-stage catalyst comprising noble metal, wherein the first-stage catalyst is made by impregnating said support material consisting of more than about 50% by weight γ-alumina and, optionally, materials selected from the group consisting of cerium oxide, barium oxide, zirconium oxide, lanthanum oxide, α-alumina, and titanium oxide with a solution of a tungsten containing compound in an aqueous or organic solvent, subsequently drying the impregnated support material, and then calcining it to leave a coating of tungsten or tungsten oxide on the support material.

3. The system according to claim 2 wherein the tungsten containing compound is selected from the group consisting of ammonium metatungstate, metatungstic acid, tungstyl acetylacetonate, and tungsten hexahalides.

4. The system according to claim 1 wherein said noble metal is selected from platinum, palladium, rhodium, and ruthenium.

5. The system according to claim 1 wherein said exhaust gas is from an internal combustion engine.

6. A method for the conversion of exhaust gases containing nitrogen oxides, carbon monoxide, and hydrocarbons which comprises sequentially exposing said exhaust gases to a first-stage catalyst comprising between about 0.1 and 3% by weight tungsten carried on a support material consisting of more than about 50% by weight γ-alumina and, optionally, materials selected from the group consisting of cerium oxide, barium oxide, zirconium oxide, lanthanum oxide, α-alumina, and titanium oxide and then a second-stage catalyst comprising a noble metal.

7. The method according to claim 6 which comprises a step of making said first-stage catalyst by impregnating said support material with a solution of a tungsten containing compound in an aqueous or organic solvent, subsequently drying the impregnated support material, and then calcining it to leave a coating of tungsten or tungsten oxide on the support material.

8. The method according to claim 7 wherein the tungsten containing compound is selected from the group consisting of ammonium meta tungstate, meta tungstic acid, tungstyl acetylacetonate, and tungsten hexahalides.

9. The method according to claim 6 wherein said noble metal is selected from platinum, palladium, rhodium, and ruthenium.

10. The method according to claim 6 wherein said exhaust gas is from an internal combustion engine.

* * * * *